United States Patent [19]
Garr et al.

[11] Patent Number: 5,341,166
[45] Date of Patent: Aug. 23, 1994

[54] SYSTEM FOR CONTROLLING SELECTED DEVICES HAVING UNIQUE SETS OF CONTROL CODES

[75] Inventors: Michael J. Garr, Bethesda, Md.; Mark J. Dale, Fairfax; Timothy Taylor, Alexandria, both of Va.

[73] Assignee: Video Control Technology, Inc., Alexandria, Va.

[21] Appl. No.: 842,531

[22] Filed: Feb. 27, 1992

[51] Int. Cl.⁵ .............................................. H04B 9/00
[52] U.S. Cl. ..................................... 348/10; 348/906; 348/734; 340/825.72
[58] Field of Search ................ 358/194.1; 340/825.22, 340/825.69, 825.72; 348/906, 6, 10, 734

[56] References Cited

U.S. PATENT DOCUMENTS

| | | |
|---|---|---|
| 4,623,887 | 11/1986 | Welles, II . |
| 4,626,848 | 12/1986 | Ehlers . |
| 4,774,511 | 9/1988 | Rumbolt et al. . |
| 4,802,114 | 1/1989 | Sogame . |
| 4,807,052 | 2/1989 | Amano . |
| 4,823,200 | 4/1989 | Evans et al. . |
| 4,856,801 | 8/1989 | Smith . |
| 4,857,898 | 8/1989 | Smith . |
| 4,866,434 | 9/1989 | Keenan . |
| 4,959,810 | 9/1990 | Darbee et al. . |
| 4,999,622 | 3/1991 | Amano et al. . |
| 5,128,668 | 7/1992 | Ikezaki .......................... 340/825.72 |
| 5,228,077 | 7/1993 | Darbee ........................ 358/194.1 X |

Primary Examiner—Mark R. Powell
Attorney, Agent, or Firm—Burns, Doane, Swecker & Mathis

[57] ABSTRACT

A control system that can be configured to control any one or more devices having dedicated sets of control codes includes a medium to distribute the codes and a decoder. In one embodiment the distribution medium is a VCR tape. The VCR tape contains data pertaining to the control codes of all devices of interest. To configure the system for a particular device, the tape is played in a VCR and the user designates the device of interest. The decoder receives the data being read from the tape, and stores that data which pertains to the device of interest. Thereafter, when the user issues a command for the device to carry out a particular function, the appropriate code is retrieved from those which have been stored and a signal is sent to the device which is in the proper format for that device, to cause it to carry out the desired function.

18 Claims, 3 Drawing Sheets

SYSTEM FOR CONTROLLING SELECTED DEVICES HAVING UNIQUE SETS OF CONTROL CODES

BACKGROUND OF THE INVENTION

The present invention is directed to the control of various devices having different codes for controlling their respective functions. In particular, the invention is directed to a system for enabling a single control unit, such as a remote control unit, to control the functions of multiple controllable devices, each of which has its own specific set of control instructions.

One area in which remote control units have gained widespread use and popularity is the field of home entertainment. A typical entertainment system might include such devices as a television, a video cassette recorder (VCR), a cable television decoder and a compact disc player. Each of these devices might be controllable by means of a remote control unit that is supplied with the device. Typically, each controllable device will have a separate remote control unit associated with it.

A standard remote control unit uses an infrared transmitter to communicate with the device to be controlled. When a user presses a key on the unit to instruct the controllable device to perform a certain function, a series of infrared pulses are transmitted to the device. These pulses correspond to a series of logical ones and zeroes which form the control code for the particular command that is being transmitted. An infrared receiver on the controllable device receives these pulses, which are decoded into an instruction signal for the device.

Generally, a remote control unit that is designed for one device is not capable of controlling the functions of another device. For different types of devices, this is usually due to the fact that the functions performed by the two devices are not the same. Thus, for example, the remote control unit for a television is not capable of controlling the playback and record functions of a VCR.

Where they have the same or similar functions, different types of controllable devices will generally employ different respective control codes for their common functions. For example, the control code to instruct a VCR to play a tape may comprise an entirely different format and/or sequence of ones and zeroes than the control code to instruct a compact disc player to play a song on the disc. In this way, the use of a remote control unit for one device will not accidently cause a different device to be activated, against the user's desires.

Furthermore, different manufacturers of the same type of equipment employ different formats and sequences of control codes for their respective devices. Thus, the set of control codes for a VCR from one manufacturer will typically be quite different from the set of control codes for a VCR from another manufacturer, even though both VCRs perform the same functions.

As a result, a different remote control unit is required for each controllable device that may be present in a consumer's home. Where a home entertainment system comprises a number of different devices, it can be appreciated that a number of different remote control units must be present. This situation is cumbersome for the consumer, not only because of the storage problem it presents, but also due to the need to keep track of, and distinguish between, all of the various remote control units.

It is therefore desirable to provide a control unit which is capable of controlling a number of different controllable devices, each of which has its own set of control codes. In the past, two different approaches have been pursued in an effort to provide a universal remote control unit. In one approach, the universal remote control unit includes a memory, typically a read-only memory (ROM), which contains the set of control codes for all known controllable devices, or a specific subset of those devices. The user selects a particular device to be controlled, for example by depressing keys on the remote control unit. In response thereto, the appropriate codes are retrieved from the memory and used to control the device. Examples of this type of universal remote control unit are disclosed, for example, in U.S. Pat. Nos. 4,774,511 (Rumbolt et al) and 4,999,622 (Amano et al).

If this type of unit is to be truly universal in nature, and compatible with all the various types of controllable devices that exist, it will be appreciated that its memory must contain a large number of control codes. Even when data compression techniques are used, the need for a sizable memory can increase the cost, and perhaps also the physical size, of the remote control unit. Even more significantly, however, is the limited applicability of the remote control unit. Since it can only work with those devices whose codes are stored in its ROM, it is not able to accommodate new models that emerge after the encoding of the ROM. Therefore, if the consumer purchases new equipment after having obtained one of these universal remote control units, he likely will not be able to use the remote control unit with the new equipment. In one specific case, a "universal" remote control unit sold by one manufacturer was not able to control the functions of a VCR that was introduced by that same manufacturer only a short while after the sale of the remote control unit.

In an effort to avoid this type of limitation, another approach to universal remote control units involves programming the unit with the codes used by each controllable device of interest. A programmable remote control unit of this type includes an infrared receiver and a programmable memory. To program the unit, the consumer is required to sequentially actuate the original remote control unit that was supplied with the device and the programmable unit. Thus, to program the universal unit to learn the control code associated with the play command for a VCR, for example, the user first presses the play button on the remote control unit that was supplied with the VCR. The programmable remote control unit must be positioned to receive the pulses emitted by the VCR's remote control unit. The play button on the programmable unit is then actuated by the consumer, to thereby inform the programmable unit of the particular command to which the received pulses pertain. This sequence may have to be performed a number of times for each individual command. Examples of this type of a programmable remote control unit are disclosed, for example, in U.S. Pat. Nos. 4,623,877 (Welles), 4,626,848 (Ehlers), 4,802,114 (Sogame) and 4,825,200 (Evans et al).

The need to program the remote control unit in this manner can prove to be cumbersome for the consumer. Typically, the instructions for performing the programming operation are technical in nature and not readily understood by the average lay consumer. In some cases, it may be necessary to obtain code information from an outside source, such as the cable television company, who may be reluctant or unwilling to provide such information. Furthermore, the infrared receiver and programmable memory increase the cost of the unit appreciably.

BRIEF STATEMENT OF THE INVENTION

It is therefore an objective of the present invention to provide a control system for a number of different types of controllable devices which is capable of remaining current with newly introduced devices and sets of control codes and which does not require extensive programming efforts on the part of the consumer. To this end, information regarding the control codes for any one of a plurality of controllable devices is distributed to consumers by means of an inexpensive, readily available medium. In one embodiment of the invention, the control codes for various controllable devices are recorded on the tape of a video cassette that is furnished to the consumer. When the consumer desires to control a particular device, the video cassette tape is played back in a VCR and the tape is read by a decoder. In response to prompts that appear on a television screen or the like, the consumer selects a particular device of interest and enters appropriate information into the decoder. The decoder reads the control codes for that device from the information provided by the video tape, and stores the codes in a memory. Thereafter, when the user issues a command for the device to perform a certain function, the control code for that function is retrieved from the memory and transmitted to the device.

If the user desires to control additional equipment with the same controller, the control codes for the additional equipment can be retrieved from the video tape, decoded and stored in a similar manner.

As new equipment with different sets of control codes appears on the market, updated versions of the video tape can be produced and made available to the consumers. Alternatively, the new codes can be transmitted by some other available medium, such as data in the vertical blanking interval of a television signal. In this manner, the controller can be programmed to remain current with all existing equipment in a relatively inexpensive manner, and without the need for extensive effort on the part of the consumer.

Although not limited thereto, the present invention is particularly adapted for use with remote control units that provide control over a number of different devices.

The foregoing features of the present invention, as well as the advantages offered thereby, are explained in detail hereinafter with reference to an illustrated embodiment of the invention.

DESCRIPTION OF THE ILLUSTRATED EMBODIMENT

To facilitate an understanding of the invention and its applications, a preferred embodiment of the invention is described with reference to its implementation in a home entertainment system. In this implementation, a single controller, including a remote control unit, is programmed to control a number of different devices, such as a television receiver, a VCR and a cable decoder. It will be appreciated by those having familiarity with the relevant technology that the practical applications of the invention are not limited to this particular embodiment. For example, it is not necessary that the control system include a remote control unit that communicates with the controlled device by means of infrared signals. The invention finds utility in any environment in which it is desirable to use a single control unit to control any one or more of a plurality of controllable devices, each of which has its own particular set of control codes.

Figure 1:
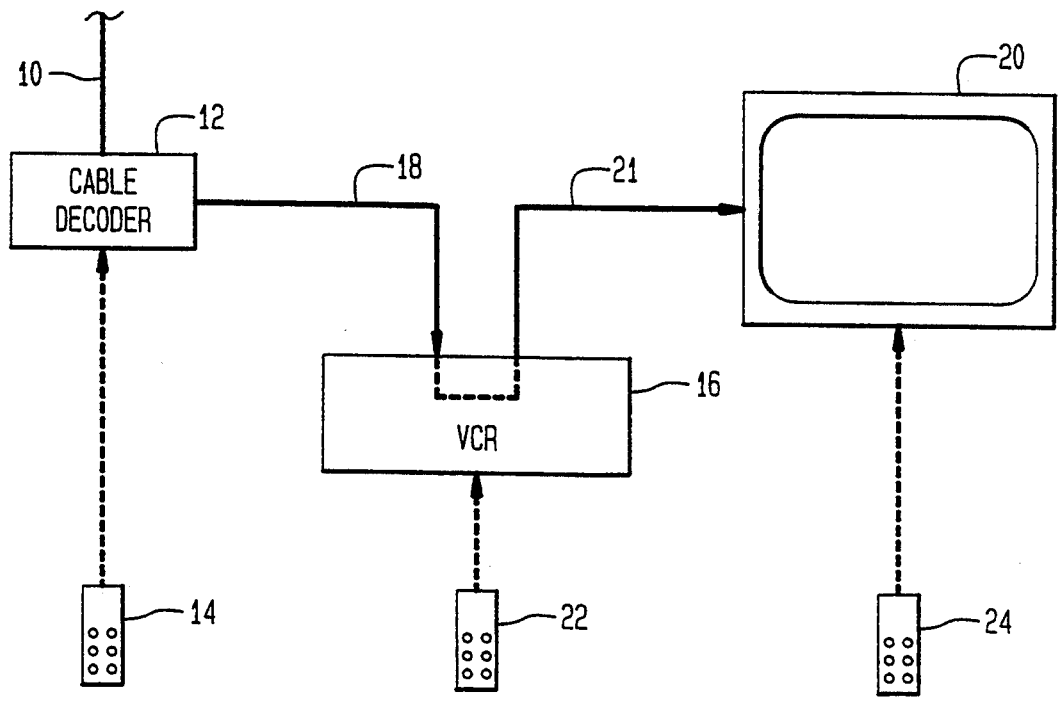
FIG. 1 is a schematic illustration of the components of a typical home entertainment system.

Referring to FIG. 1, a home entertainment system, of the type in which the present invention can be employed, is illustrated in block diagram form. This particular system is one designed to receive television signals through a cable TV network. The incoming television signal enters the household through a drop line 10, which is connected to the main trunk of the cable TV system. The drop line 10 terminates at a cable decoder box 12, through which the viewer is able to select a particular channel to be viewed. The cable decoder box 12 has an associated remote control unit 14, by means of which the viewer can enter the desired channel, control the volume and step through the available channels, for example.

The output terminal of the cable decoder box 12 is connected to a VCR 16 by means of a suitable cable 18 or the like. The television signal appearing on the cable 18 is looped through the VCR and presented to a television receiver 20 by means of another cable 21, for viewing. Each of the VCR 16 and the television receiver 20 also has an associated remote control unit 22 and 24, respectively, for controlling their individual functions.

Each of the remote control units 14, 22 and 24 communicates with its associated device by means of infrared signals, which are represented by the dashed lines in the figure. The infrared signals transmitted from a remote control unit to its associated device are typically pulse code modulated or pulse position modulated, to transmit a series of logical ones and zeroes which represent the control code for the function to be carried out. To avoid interference between various devices, different control code formats and different sequences of ones and zeroes are used for the transmission of information from each remote control unit to its associated device. Thus, each of the cable decoder box 12, the VCR 16 and the television receiver 20 requires its own, dedicated remote control unit which contains the set of control codes for that device.

Figure 2:
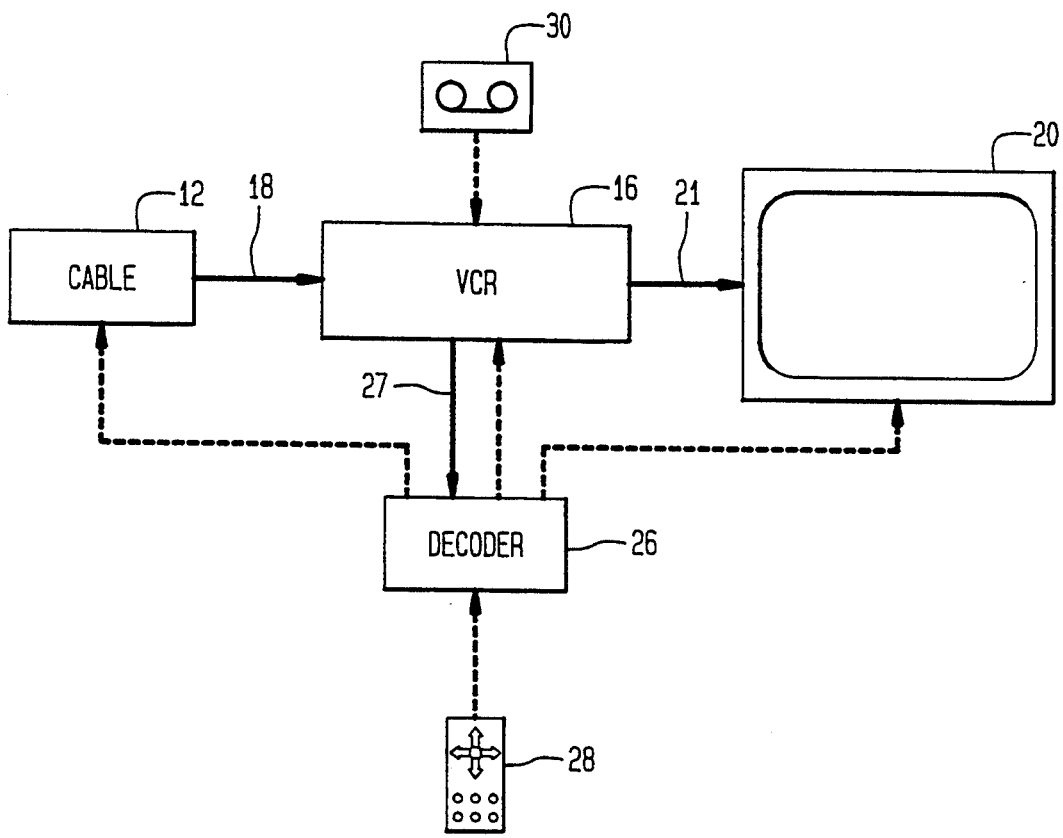
FIG. 2 is a block diagram illustration of a home entertainment system incorporating the present invention.

A system in accordance with the present invention, which enables all three of the controllable devices to have their functions controlled by means of a single controller, is illustrated in functional block diagram form in FIG. 2. Referring thereto, the cable television decoder 12, the VCR 16 and the television receiver 20 are connected to one another in the same manner as the embodiment of FIG. 1. A control decoder 26 is also connected to the VCR 16, to receive signals therefrom.

For example, the decoder 26 can be connected to the VIDEO OUT terminal that is typically found on most VCRs, by means of a cable or wire 27. An input device, such as a remote control unit 28, is associated with the decoder 26.

The decoder 26 contains the set of control codes associated with each of the controlled devices, namely the cable TV decoder 12, the VCR 16 and the television receiver 20. In response to a command signal from the remote control unit 28, the decoder 26 transmits the appropriate control signal to cause the commanded function to be carried out by the associated device. Preferably, the remote control unit 28 communicates the command information to the decoder 26 by means of infrared pulses or other equivalent forms of remote communication, such as radio waves, microwave or the like. In response, the decoder 26 transmits infrared pulses, with the appropriate control codes, to each of the controlled devices 12, 16 and 20, as indicated by the dashed lines in the figure. Alternatively, if the controlled devices are suitably equipped, the control decoder 26 can be connected to each of them by means of a cable or wire, and provide the control codes via this medium.

In the particular embodiment illustrated in FIG. 2, the remote control unit 28 communicates only with the control decoder 26. As explained in detail hereinafter, this is not the only possible configuration of the components which comprise the inventive concept. For this particular configuration, the command signals which the remote control unit 28 transmits to the decoder 26 do not have to be in the same format as the control codes used by the various devices 12, 16 and 20. Any suitable format and pulse sequence can be used for these transmissions. However, the control codes that are transmitted from the control decoder 26 to each of the devices 12, 16 and 20 must be in the format and contain the required sequence of logical ones and zeroes appropriate for the particular device being controlled.

In one embodiment of the present invention, the sets of control codes that are required to operate each of the controlled devices 12, 16 and 20 are provided to the control decoder 26 by means of a video tape 30. The video tape 30 contains the control codes for all of the controllable devices of possible interest. For example, if the total universe of control codes is not too great, the sets of codes for all commercially available cable TV decoder boxes, all VCRs and all television receivers could be stored on a single VCR tape 30. If the number of control codes is too great to be stored on a single tape, separate tapes could be provided for the cable decoders, VCRs and television receivers, respectively.

The set of control codes can be stored on the video tape 30 in any one of a number of different manners. For example, the codes could be stored as data in the vertical blanking interval portion of a video signal. With this type of arrangement, the active portion of the video signal can be employed in a normal manner to generate informational screens that appear on the television receiver 20 during the set-up procedure, to assist the user or provide a description of the product and its operation. For example, an initial screen could comprise an index of all possible devices which are capable of being controlled by means of the sets of control codes stored on the tape, along with a number to designate each device. If such displays are not to be employed, the sets of control codes can be stored as data in the entire video signal, to thereby provide more information per tape.

Alternatively, or in addition, the control codes can be stored on an aural subcarrier or other portion of the audio signal on the tape.

Figure 3:
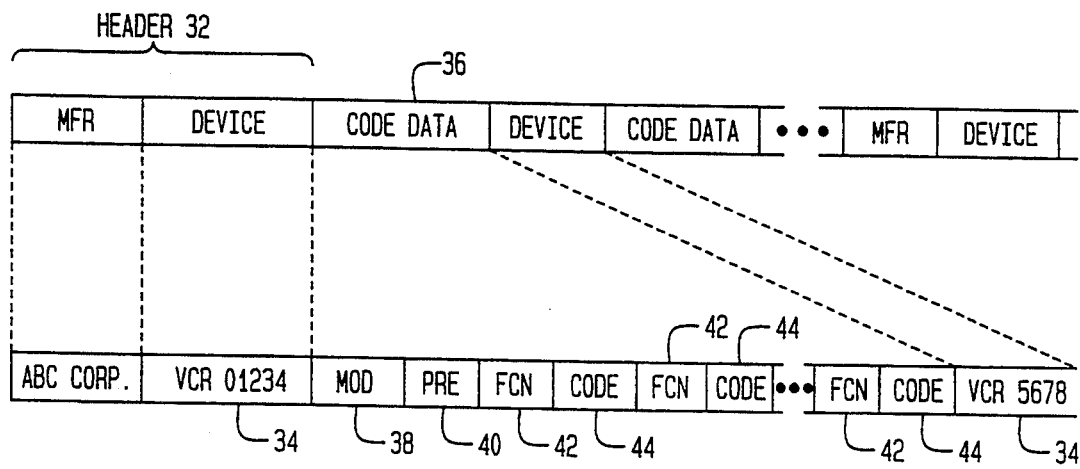
FIG. 3 is a diagram illustrating one format for storing the control codes on tape.
Figure 4:
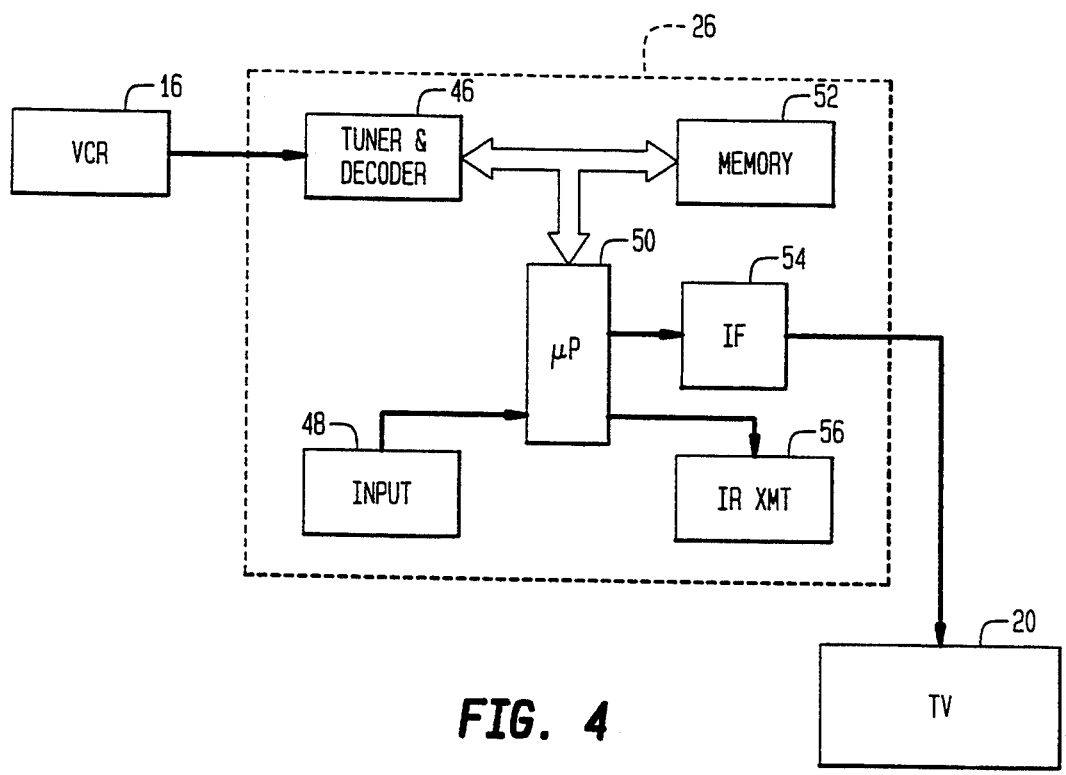
FIG. 4 is a more detailed block diagram of the decoder for the control system.

The control codes are stored on the tape in a manner which enables them to be individually identified and selected. Referring to FIG. 3, for example, each set of control codes can be preceded by header information 32 which identifies the particular manufacturer and device or devices to which that set of codes pertains. The device data 34 can include the type of device, e.g. VCR, and the model number of the device. Of course, where the model number inherently identifies the type of device, it is not necessary to include separate data for the device type. Following the header information 32 is data 36 pertaining to the control codes for the identified device. This data includes an indication of the type of modulation 38 that is employed, e.g. whether the infrared pulses are to be pulse code modulated or pulse width modulated. Following this information is an identification of the preamble 40 that is used with every command that is sent to the controlled device. Typically, this preamble is unique to the device, to avoid interference from commands intended for other devices. Following the preamble data is an identification 42 of each controllable function of the device and the code sequence 44 for that function. Following the data for all of the controllable functions and their respective code sequences, an identification 34 of the next device for that manufacturer and its code data is stored on the tape.

Alternatively, the set of control codes for each device might be stored at a precise location on the tape, and that location is identified by the number associated with the device on the index of devices. In this arrangement, the header information may be unnecessary.

In operation, when the user desires to configure the control system for various devices of interest, the video tape 30 containing the control codes is inserted in the VCR 16. As the tape begins to play, a menu is displayed on the television receiver 20. This menu contains a listing of all of the devices whose control codes are stored on the tape. From this menu, the viewer selects the particular device which is to be controlled, e.g. the brand and model number of the VCR 16. The user selects this particular model, for example, by entering into the remote control unit 28 a multi-digit code number associated with that model, which appears adjacent the model name on the television display.

A more detailed block diagram of the control decoder 26 is illustrated in FIG. 3. Referring thereto, the control decoder 26 includes a decoding unit 46 for receiving the information from the VCR 16. If the decoder is connected to receive the signals from the VCR over a television channel, e.g. channel 3 or 4, the decoding unit can also include a tuner which is set to the particular channel of interest. These signals are transmitted from the VCR in the form of standard television signals. The decoding unit retrieves the data encoded within the television signal, i.e. the sets of control codes and other control data, and generates a data signal.

An input device 48 enables the user to indicate his selections for the particular devices to be controlled during the set-up process, as well as the commanded functions to be carried out during normal operation. The input device 48 could comprise a key pad or keyboard connected to the decoder, for example. More preferably, however, the input device is an infrared receiver, which receives command pulses transmitted by the remote control unit 28.

A microprocessor 50 receives the commands entered through the input device 48. During the set-up process, the microprocessor receives the user's selections regarding the particular devices to be controlled. Once the user identifies a certain device, the microprocessor 50 examines the data that is being read from the VCR tape by means of the decoding unit 46. For example, if each set of control codes is preceded by header information, that information can include the multi-digit identification code number entered via the user. As the tape 30 in the VCR is being played, the microprocessor 50 examines each item of header identification. When the identification code for the particular device of interest is detected, the microprocessor 50 causes the information that follows the header, i.e. the set of control codes for that device, to be stored in a memory 52.

During the initial configuration of the control system, while the appropriate control codes are being stored in the memory 52, it may be desirable to generate various information screens on the display of the television receiver 20. As noted previously, one of these screens can include an index of all devices that can be controlled by the codes stored on the tape. In addition, it may be desirable to present instructions which step the user through the set-up process. These instructions can also be stored on the tape 30. Preferably, these instructions are downloaded to the memory 52 when the tape is first beginning to play. In addition, the memory 38 can include a preset set-up program which assists the user in the initial operation.

When the decoder is first activated, this set-up program can be retrieved from the memory and presented to the television receiver 20 through a suitable interface unit 54. This interface unit can include a display controller and/or modulator for sending the appropriate signals to the television receiver 20 to generate the information screens. In response to a particular selection from the user, the microprocessor can retrieve an appropriate instruction that was downloaded from the tape and transmit it to the television for display. Thus, for example, when the user identifies a particular device whose codes are to be stored in the memory 52, a related instruction can request the user to advance the tape to a certain location, to thereby dispense with the need to scan a large portion of the tape before retrieving the codes of interest.

All of the sets of control codes for the devices to be controlled are stored in the memory 52 in this manner.

Figure 5:
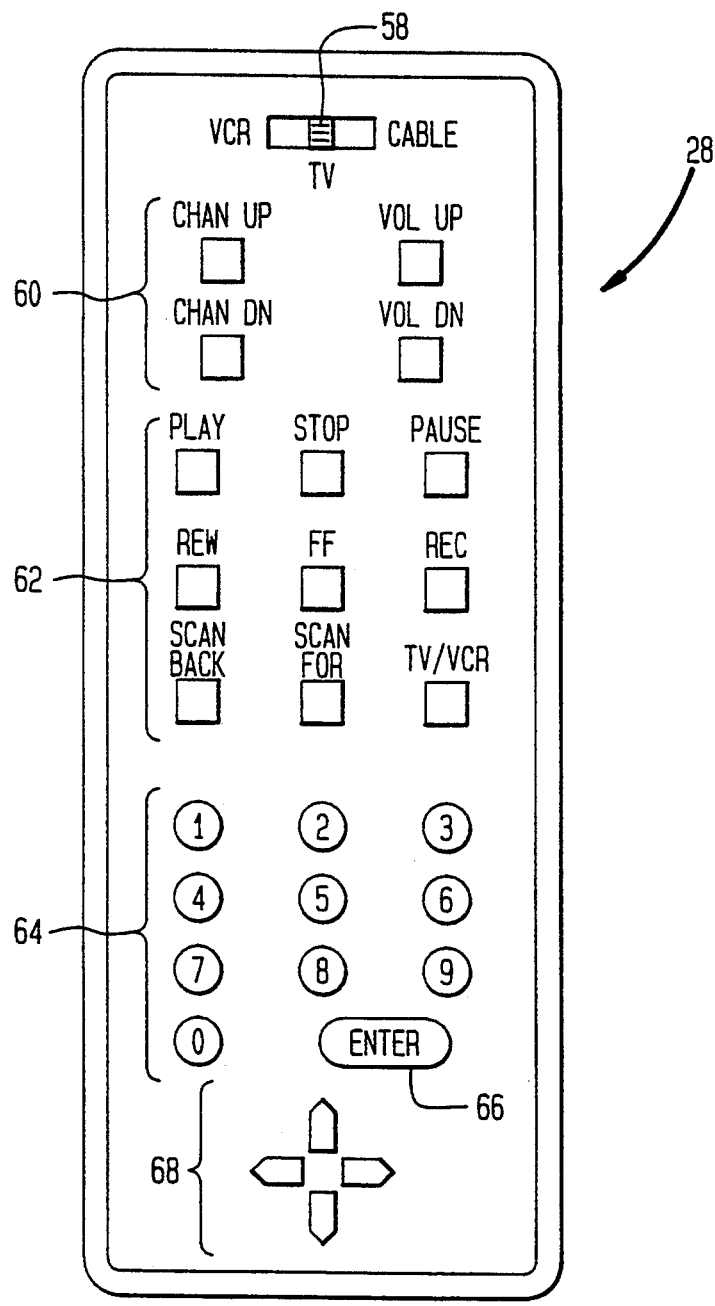
FIG. 5 is a plan view of the hand-held remote control unit.

Subsequently, during normal operation, the user depresses keys on the remote control unit 30 to generate a command for a function to be carried out by one of the controlled devices. An example of the keys which might be found on the remote control unit is illustrated in FIG. 5. The unit includes a switch 58 for selecting the particular device to be controlled, such as the television 20, the VCR 16 or the cable decoder 12. One set of keys 60 enable the channel being viewed and the volume to be controlled, either through the televisions set 20 or the cable decoder 12. Another set of keys 62 is associated with the functions of the VCR. A set of digit keys 64 allows the user to select a specific channel, to enter programming information for the VCR, and to select the devices whose codes are to be stored during the initial programming of the control system. Associated with the digit keys 64 is one or more function keys 66 to control the entry of information. In addition, the remote control unit can include a set of cursor keys 68 for controlling a cursor which may appear onscreen, for example during the initial programming of the system or during various services, such as onscreen program scheduling information.

Each key on the remote control unit generates a command signal when it is depressed. This command is received by the input unit and supplied to the microprocessor 50. In response thereto, the microprocessor retrieves the appropriate control code from the memory 52. The microprocessor 50 causes an infrared transmitter 56 to generate pulses in accordance with that control code, thereby causing the controlled device to carry out the commanded function.

In the embodiment illustrated in FIG. 2, the functions of the decoder 26 are shown to be carried out in a separate stand-alone unit, which communicates with the remote control unit 28. In practice, however, the control system of the present invention need not be configured in such a manner. Preferably, the components of the decoder 26 are incorporated in another structure that is present in the consumer's home. For example, the functions of the decoder can be built into the cable decoder box 12, so that the user will only have one physical piece of structure present rather than two. When infrared signals are transmitted in response to a command from the remote control unit 28, the infrared transmitter 56 sends an infrared signal into the room containing the entertainment system. This signal is reflected by the walls of the room, and received at the device for which it is intended.

Alternatively, many of the functions of the decoder can be incorporated into the remote control unit itself. For example, the remote control unit can include the microprocessor 50 and memory 52. During initial setup, the remote control unit can be plugged into the decoder unit 46 and receive the control codes retrieved from the tape by means of a direct connection. Thereafter during normal operation, the remote control unit can communicate directly with the controlled devices by transmitting the appropriate codes stored in its internal memory, rather than through the decoder box 26.

From the foregoing, it will be appreciated that the present invention provides a system which enables a consumer to control multiple devices, each of which has its own set of control codes, through a single controller. By using a readily available medium to supply the desired control codes to the control system, it is possible to continually update the sets of control codes in an inexpensive manner and thereby maintain the system compatible with all currently available sets of control codes. If new equipment is purchased, a new VCR tape can be requested, to provide an up-to-date version of all available sets of control codes without significant expense to the consumer.

In this regard, although a VCR tape has been described as one preferred medium by which the codes can be distributed to users, the implementations of the invention are not limited thereto. For example, the control codes can be transmitted to the consumer as data which is present within the vertical blanking interval of the television signal broadcast from a particular station or transmitted over the cable network. In this case the decoder unit 46 would include suitable conventional means to read this data from the television signal, such as the decoding devices for closed-caption data or teletext. This approach allows the sets of control codes to be dynamically updated.

Further along these lines, the distribution of the control codes can be carried on an as-needed basis out in an interactive manner. For example, when a consumer purchases a piece of equipment that is capable of being remotely controlled, he can make a telephone request for the codes pertaining to that piece of equipment. In response, the desired codes can be retrieved at a central location, and transmitted from the head end of a cable system or the like in the television signal.

It will therefore be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A system for enabling any one of a plurality of controllable devices having different respective sets of control codes to be controlled by means of common commands, comprising:
    a video cassette tape having stored thereon the respective sets of control codes for each of the plurality of controllable devices;
    means for enabling a user to select a particular one of the controllable devices whose set of control codes is stored on the video cassette tape;
    a decoder that is responsive to selection of the particular one of the controllable devices for retrieving the set of control codes for that particular device from the video cassette tape and storing the retrieved set of control codes in a memory;
    an input device for issuing commands to control a controllable device; and
    control means responsive to a command from said input device for retrieving a control code corresponding to said command from said memory and transmitting said control code to a controllable device to cause the command to be carried out by said controllable device.

2. The system of claim i wherein said input device comprises a remote control unit that communicates with said control means by infrared signals.

3. The system of claim 2 wherein said means for enabling a user to select a particular one of the controllable devices includes said remote control unit.

4. The system of claim 1 wherein said transmitting means transmits control codes to the controllable device by means of infrared pulses.

5. The system of claim 1 wherein said memory, aid input device and said control means are housed in a remote control unit that communicates with controllable devices by means of infrared signals.

6. A system for controlling any one or more controllable devices from a multiplicity of controllable devices, each of which has a different respective set of control codes, comprising:
    a video cassette tape containing sets of control codes for the multiplicity of controllable devices;
    an input device for enabling a user to issue a command which identifies a function to be carried out by a specific controllable device; and
    a decoder for retrieving and storing a particular set of control codes from those contained on said tape and, in response to a command from said input device, transmitting one of the stored control codes that pertains to the identified function.

7. The system of claim 6 wherein said decoder includes means for retrieving data pertaining to sets of control codes from signals generated by a video cassette recorder during playback of the video cassette tape.

8. The system of claim 6 wherein said input device comprises a remote control unit that transmits commands to said decoder by means of infrared signals.

9. The system of claim 8 wherein said decoder transmits control codes to controllable devices remotely by means of infrared signals.

10. A method for controlling any one of a plurality of controllable devices having different respective sets of control codes, comprising the steps of:
    storing the sets of control codes for each of the plurality of controllable devices on a video cassette tape;
    selecting one of the controllable devices;
    playing the video cassette tape on a video cassette player to reproduce information stored thereon and retrieving from said information the set of control codes which pertain to the selected controllable device;
    storing the retrieved set of control codes in a memory;
    issuing a command for the selected controllable device to carry out a particular function;
    reading from the memory the stored control mode which pertains to the particular function; and
    transmitting the control code read from memory to the selected controllable device.

11. The method of claim 10 wherein said retrieving step further includes the steps of examining the information reproduced from the tape, detecting an identification corresponding to the selected controllable device and forwarding a set of control codes associated with that identification to the memory for storage.

12. The method of claim 10 wherein said transmitting step includes the step of generating infrared pulses corresponding to the control code.

13. A system for providing any one of a plurality of selectable sets of information that are each associated with a particular operation, comprising:
    a video cassette tape containing each of said plurality of selectable sets of information;
    an input device for enabling a user to identify one of the plurality of sets of information that is to be employed in the performance of the operation;
    means for retrieving the identified set of information from the video cassette tape; and
    means for providing information from said retrieved set to a utilization device in connection with the performance of said operation.

14. The system of claim 13 wherein said operation is associated with the display of a program on a television receiver.

15. The system of claim 13 wherein said sets of information are mutually exclusive of one another.

16. The system of claim 13 wherein said retrieving means includes a video cassette player.

17. The system of claim 16 wherein said retrieving means further includes a memory for storing the set of information retrieved from the video cassette tape.

18. The system of claim 13 wherein said operation comprises the control of the utilization device in accordance with a command entered via said input device.

* * * * *